C. S. NYBERG.
APPARATUS FOR THE IRRIGATION OF FIELDS, GARDENS, AND THE LIKE.
APPLICATION FILED JULY 1, 1916.

1,217,811.

Patented Feb. 27, 1917.
5 SHEETS—SHEET 1.

C. S. Nyberg.
Inventor.
By Albert E. Parker
Attorney.

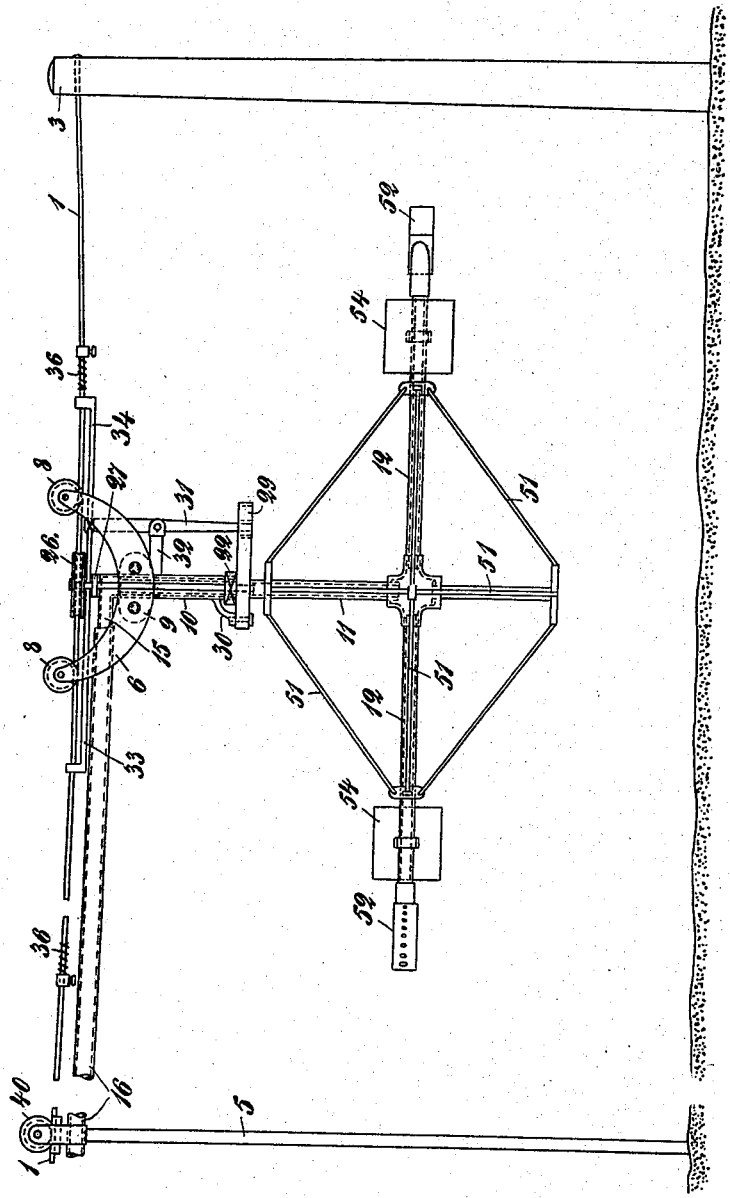

C. S. NYBERG.
APPARATUS FOR THE IRRIGATION OF FIELDS, GARDENS, AND THE LIKE.
APPLICATION FILED JULY 1, 1916.
1,217,811.
Patented Feb. 27, 1917.
5 SHEETS—SHEET 3.
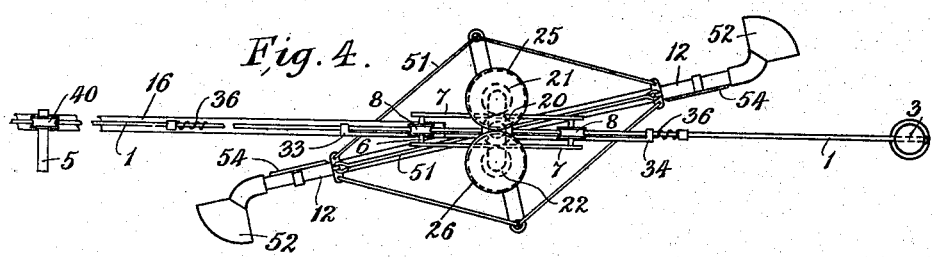
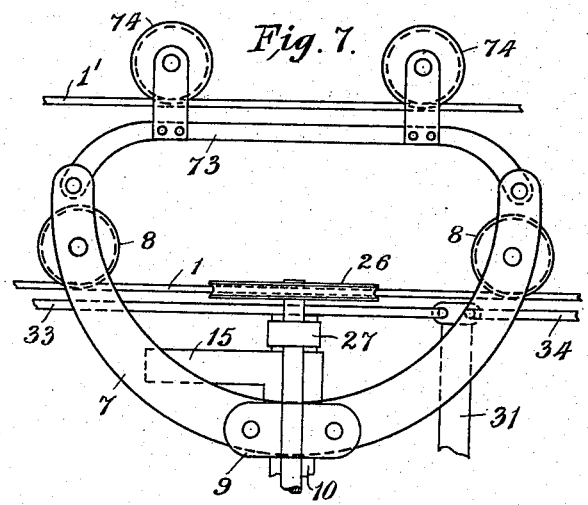
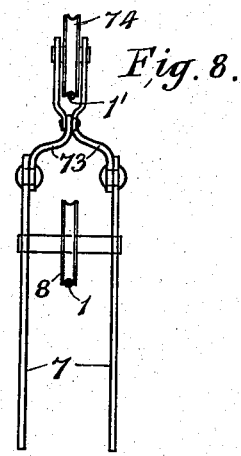
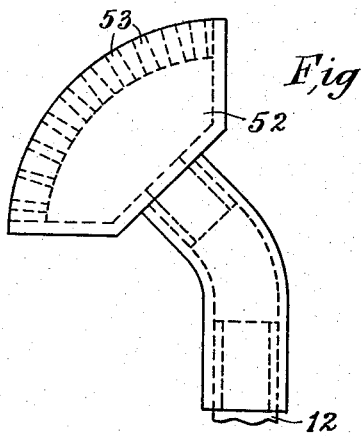
Inventor
C. S. Nyberg.
By Albert Parker
Attorney

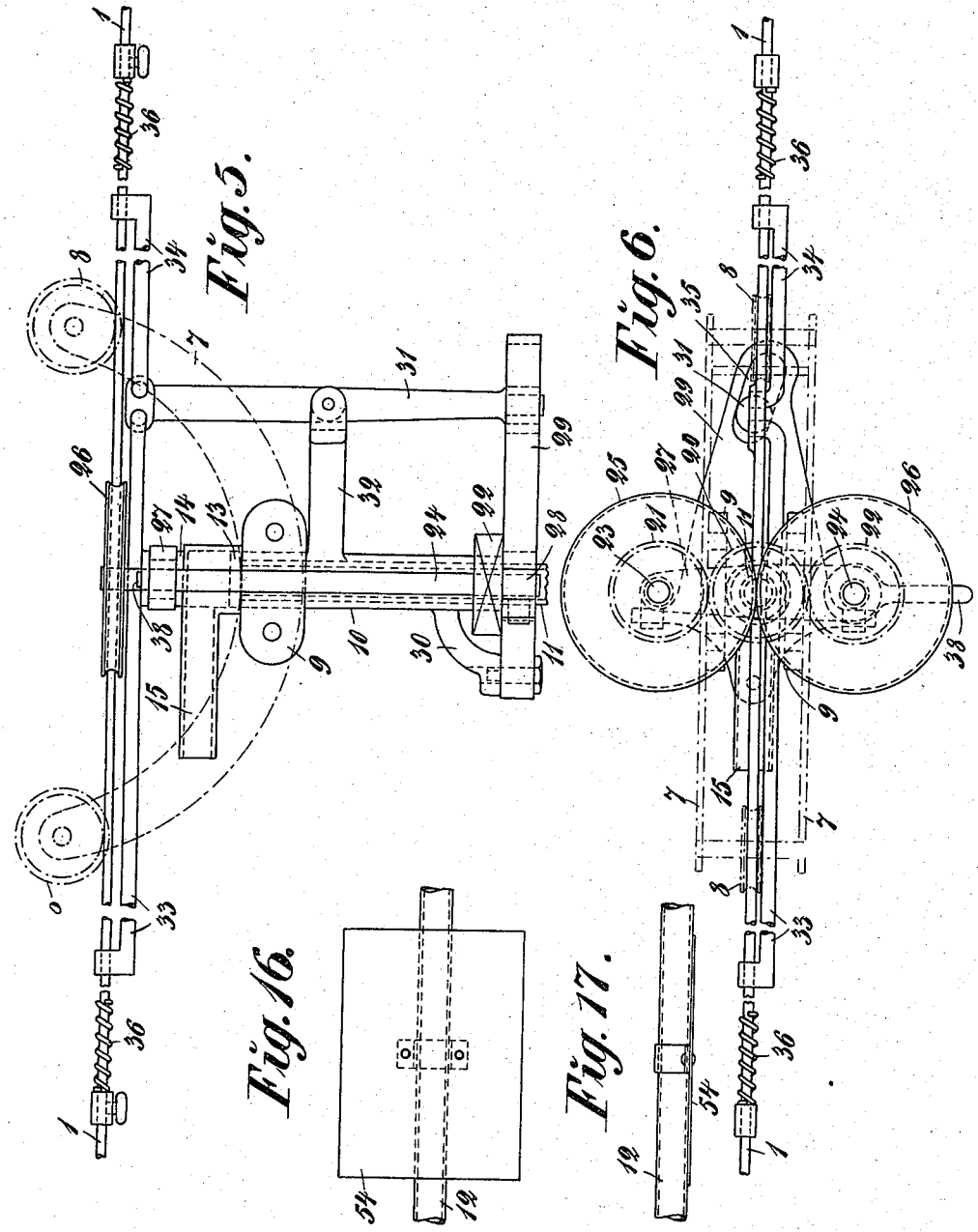

C. S. NYBERG.
APPARATUS FOR THE IRRIGATION OF FIELDS, GARDENS, AND THE LIKE.
APPLICATION FILED JULY 1, 1916.
1,217,811.
Patented Feb. 27, 1917.
5 SHEETS—SHEET 5.
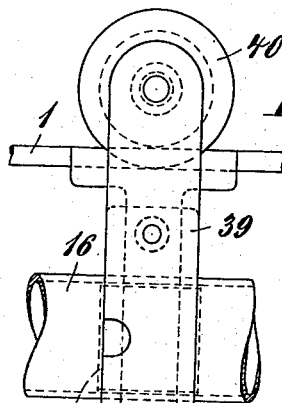
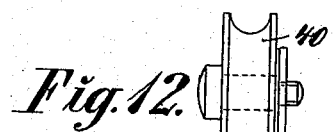
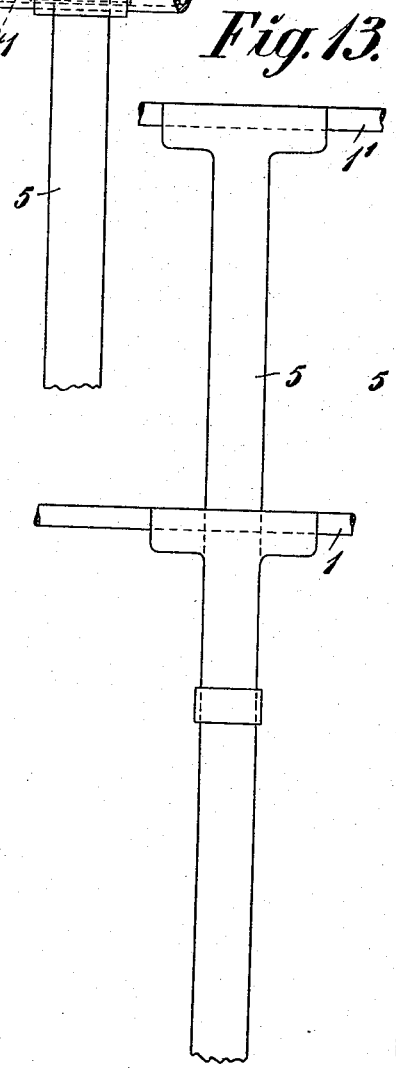
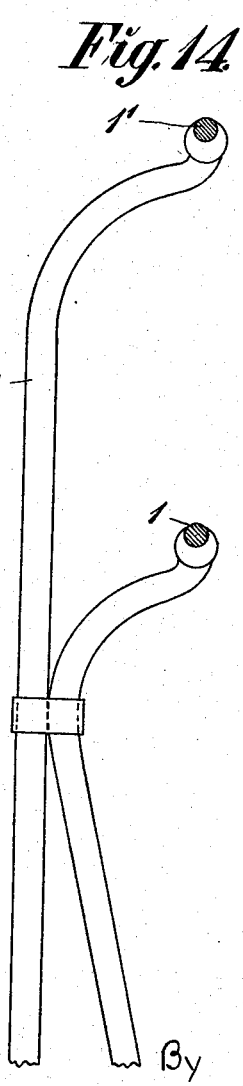
C. S. Nyberg, Inventor.
By Albert H. Parker, Attorney.

UNITED STATES PATENT OFFICE.

CARL SIGFRID NYBERG, OF HASSELBACKEN, MELLÖSA, SWEDEN.

APPARATUS FOR THE IRRIGATION OF FIELDS, GARDENS, AND THE LIKE.

1,217,811. Specification of Letters Patent. Patented Feb. 27, 1917.

Application filed July 1, 1916. Serial No. 107,182.

*To all whom it may concern:*

Be it known that I, CARL SIGFRID NYBERG, a subject of the King of Sweden, and resident of Hasselbacken, Mellösa, in the Kingdom of Sweden, have invented certain new and useful Improvements in Apparatus for the Irrigation of Fields, Gardens, and the like, of which the following is a specification, reference being made to the accompanying drawings.

The present invention has for its object an apparatus for the irrigation of fields, gardens and the like which principally consists of a so called Scottish turbine movable along a cable way and connected with one end of a hose the other end of said hose being connected with a wheel in such a way that the hose may be wound on to or off the same as the case may be, while water is conducted through the hose.

The invention is illustrated in the accompanying drawings in which:

Figs. 3 and 4 show in elevation and plan respectively a part of the arrangement shown in Fig. 1 on an enlarged scale;

Figs. 5 and 6 show in elevation and plan respectively certain parts of Figs. 3 and 4 on a still larger scale;

Figs. 7 and 8 are an elevation and end view respectively of the form of supporting carriage used with the arrangement shown in Fig. 2.

Figs. 11 and 12 show side and end views respectively of a post for supporting the cable according to the arrangement shown in Fig. 1;

Figs. 13 and 14 show similar views of a post for supporting the two cables according to the arrangement shown in Fig. 2;

Figs. 15, 16 and 17 show details hereinafter referred to.

Figure 1:
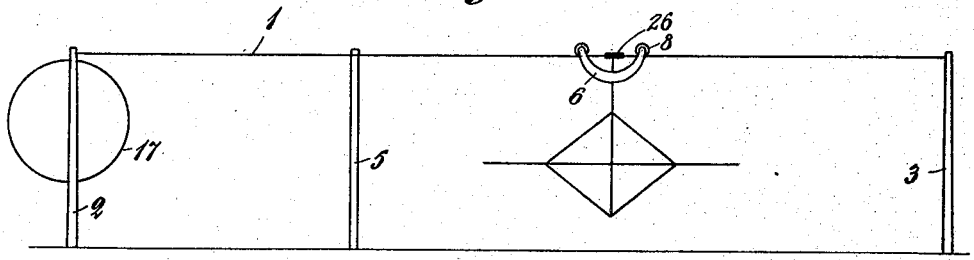
Figure 1 shows diagrammatically one arrangement of the main parts.
Figure 2:
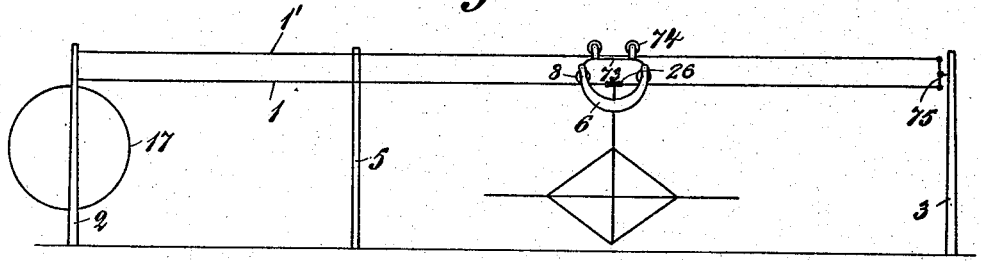
Fig. 2 shows diagrammatically a modified arrangement.

The forms of construction shown in Figs. 1 and 2 principally differ from each other only with regard to the cable way which may be arranged differently dependent on the required length of the same, the conditions of the ground and certain other circumstances that may have an influence upon the arrangement of the cable way. If the latter is relatively short it may be sufficient with a single cable 1 (preferably a wire) without any support for the same between the end posts 2 and 3 supporting the cable relatively high above the ground and being placed at opposite ends of the field. If on the other hand the cable way is relatively long it may be necessary, according to the circumstances, to use either a single cable with one or more intermediate posts 5 between the end posts 2 and 3, or two cables 1 and 1', located the one above the other, Fig. 2. In this case the distance between the end posts 2, 3 may be relatively long without any intermediate post being required. But even in this case one or more intermediate posts might be used, each being then provided with two sustaining points, one for each cable. When arranging the cable way, attention should also be paid to the fact that, when intermediate posts are used, the ground cannot be irrigated uninterruptedly between the two end posts, but only between two adjacent posts whereafter, when such a section has been irrigated, the apparatus must be brought over to the adjacent section on the other side of the intermediate post.

The end posts 2 and 3, which are kept in proper position by means of suitable stays, may be either fixed in the ground and a required number of cable ways arranged over the field between them, or the posts may be movable, whether the cable way is arranged according to Fig. 1 or to Fig. 2, so that, when a strip of a certain width of the field has been irrigated the posts may easily be moved and placed in proper position for the irrigation of the adjacent portion of the field.

On the cable 1 (Figs. 1 and 2) there is arranged a carriage 6 consisting of two archshaped side plates 7 between the ends of which are located wheels 8 with grooves to enable the wheels to run on the cable, said plates having their central portions firmly connected with lugs 9 on a frame 10 the form of which is shown in Figs. 3 and 5. The upright central part of this frame is tubular shaped and through this part passes the upper end of the tube 11 from the lower end of which project the tubes 12 forming the arms of the Scottish turbine. At its upper end the tube 11 is provided with a flange 13 resting on a shoulder provided in the frame 10 and by which the tube with the turbine are rotarily supported. The tube 11 is introduced into the frame through a hole provided in the upper end of the same and closed with a threaded plug 14. From the upper part of the frame projects a hollow arm 15 through which the water is supplied into the frame to the tube 11 and the turbine.

The water is fed to the turbine through a hose 16 one end of which is connected with the arm 15 and which is somewhat longer than the distance between the posts 2 and 3. The hose is arranged to be wound on to or off from a wheel 17 and is supplied with water in any known or convenient manner.

Figure 9:
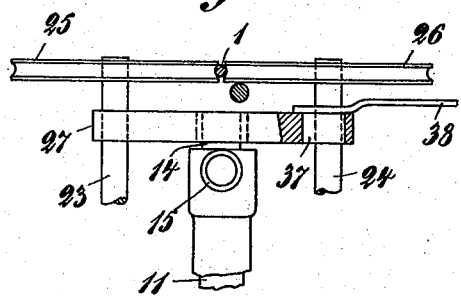
Figs. 9 and 10 are an end view and plan view respectively of the friction wheels used for propelling the carriage and means for increasing the grip of same.
Figure 10:
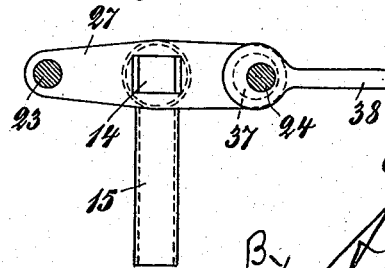

When the water is admitted to the hose the turbine is caused to rotate. The water streaming out from the same is spread over the ground so that the latter becomes irrigated. For moving the turbine along the cable 1 so that a strip of the ground along the cable way may be irrigated the following provision is made. On the tube 11 is fixed a pinion 20 which can be brought to mesh with the one or the other of two toothed wheels 21, 22 each of which is keyed on a shaft 23, 24 respectively, said shafts being journaled one on each side of the frame 10. Each of said shafts carries at its upper end a friction wheel 25 and 26 respectively each having on its circumference a groove for the cable 1, so that when said wheels are pressed against the cable and brought to rotate, they move along said cable. The shafts 23 and 24 are journaled at their upper ends in a cross piece 27 (see particularly Figs. 9 and 10) which is provided with a central square hole into which is inserted a square pin provided on the threaded plug 14, said shafts being at their lower ends journaled in sleeves 28 that are rotatably connected with a cross armed lever 29. This lever is fulcrumed on an arm 30 projecting from the frame 10, said lever being provided with a hole through which the tube 11 passes and which is sufficiently wide to allow the lever to be turned a little on its fulcrum. It is obvious that, when the pinion 20 meshes with the toothed wheel 21, the rotating turbine moves in one direction along the cable 1, and that, when said pinion meshes with the other wheel 22, the turbine moves in the opposite direction. The direction of movement is reversed automatically, when the turbine arrives at the end of its course, with the aid of a lever 31 that is fulcrumed on an arm 32 projecting from the frame 10. The lever 31 is at its upper end connected with two rods 33 and 34 extending one in each direction along the cable 1 and surrounding the latter at their outer ends. The lower end of the lever 31 extends into an oblique slot 35 provided in the cross armed lever 29, so that when the lever 31 is shifted, thereby moving its lower end in a direction parallel with the cable 1, the lever 29 will then be caused to turn around its fulcrum (the arm 30), whereby the pinion 20, dependent on the direction in which the lever 29 is turned, is brought to mesh with the one or the other of the wheels 21 and 22. When the turbine arrives at the end of its course, that one of the rods (33, 34) which is foremost during the movement strikes against a spring 36 surrounding the cable and attached to the same by means of a clamping screw or the like at any desired point. For tightening the friction wheels 25, 26 against the cable 1 the shaft of one of said wheels passes through an eccentric sleeve 37 (see Figs. 9 and 10) rotarily supported in the cross piece 27 and provided with a projecting arm 38 by means of which the sleeve can be turned and thus the tightening regulated.

When the turbine during its movement along the cable way moves away from the wheel 17 the traction in the hose is sufficient for rotating the wheel, the hose being thereby unwound from the same. In order that the water-filled heavy hose may when pulled out be supported by the cable, the hose is provided with a number of clips 39 (see Figs. 11 and 12) surrounding the same and adapted to be fastened on the latter around a tube piece 41 located inside the hose. Each clip carries at its upper end a roller 40 adapted to run on the cable 1.

When the hose has been unwound from the wheel 17 and the turbine has arrived at the end of its course and then begins to return the hose is again wound on to said wheel in any convenient manner.

The above described arrangements for moving the turbine along the cable way are evidently the same whether the turbine is suspended as in Fig. 1 or as in Fig. 2. The form of construction according to Fig. 2 is different from the other only with regard to the carriage, which has the upper ends of its side pieces connected by means of a yoke 73 carrying at a convenient height two rollers 74 running on the cable 1'. In order that both cables may easily obtain the same tension their ends are connected with the ends of a double armed lever 75 (see Fig. 2) the middle part of which is connected with the post 3.

When the cable ways according to Fig. 2 have such a length that it is necessary to apply intermediate posts for the cables 1 and 1' the posts 5 may be arranged as shown in Figs. 13 and 14.

The turbine itself may be of any suitable construction and provided with any suitable number of arms formed by tubes 12. In the drawings two arms only are shown which, with regard to their length relatively to their diameters, are stiffened vertically as well as laterally by means of a number of stays 51. The discharge nozzles 52 are preferably flattened and under ordinary circumstances located horizontally and provided with a number of discharge openings 53. With regard to the action which the water discharged through them exercises on the rotation of the turbine and also to the spreading of this water the discharge openings have varying diameters, this varying being such that the opening whose longitudinal direction is nearly perpendicular to the longitudinal direction of the turbine arm is the smallest one (see Fig. 15) and that the diameters of said openings then increase so that the last one in the row whose longitudinal direction is nearly parallel to the turbine arm is the greatest one. The influence of the discharge of the water on the rotation of the turbine and also on the spreading of the water can be varied within certain limits by turning the nozzle from its horizontal position to a more or less oblique position or down to a vertical position. The speed of rotation of the turbine varies with the water pressure in the pipe and for regulating said speed adjustable wings 54 are provided on the arms of the turbine, said wings effecting a certain air resistance according to their positions.

Having now described my invention, what I claim as new and desire to secure by Letters Patent is:

1. In an irrigating apparatus the combination of a suspended cable, a carriage mounted on and adapted to traverse said cable, a revoluble sprayer adapted to be rotated by the action of the spraying liquid issuing therefrom and carried by said carriage, means for supplying liquid to said sprayer under pressure, a pair of wheels mounted on said carriage and adapted to engage said cable, and means for rotating either of said wheels alternatively from the rotating sprayer so as to propel the carriage in either direction along the cable.

2. In an irrigating apparatus the combination of a supporting track, a carriage mounted on and adapted to traverse said track, a revoluble sprayer, a shaft journaled in said carriage and secured to said sprayer, a pair of friction wheels each adapted to engage with said track, independent shafts each supporting one of said friction wheels, a gear wheel on each of said latter shafts, and a further gear wheel mounted on the first mentioned shaft and adapted to be engaged alternatively by one or other of the said gear wheels so as to propel the carriage in either direction.

3. In an irrigating apparatus the combination of a supporting track, a carriage mounted on and adapted to traverse said track, a revoluble sprayer, a shaft journaled in said carriage and secured to said sprayer, a pair of friction wheels each adapted to engage with said track, independent shafts each supporting one of said friction wheels, a gear wheel on each of said latter shafts, a further gear wheel mounted on the first mentioned shaft and adapted to be engaged alternatively by one or other of the said gear wheels so as to propel the carriage in either direction, and means for automatically changing such engagement when the carriage reaches the end of its travel so as to reverse the direction of movement of the carriage.

4. In an irrigating apparatus the combination of a supporting track, a carriage mounted on and adapted to traverse said track, a revoluble sprayer, a shaft journaled in said carriage and secured to said sprayer, a pair of friction wheels each adapted to engage with said track, independent shafts each supporting one of said friction wheels, a gear wheel on each of said latter shafts, a further gear wheel mounted on the first mentioned shaft and adapted to be engaged alternatively by one or other of the said gear wheels so as to propel the carriage in either direction, and means for automatically changing such engagement when the carriage reaches the end of its travel in either direction.

5. In an irrigating apparatus the combination of a supporting track, a carriage mounted on and adapted to traverse said track, a revoluble sprayer, a shaft journaled in said carriage and secured to said sprayer, a pair of friction wheels each adapted to engage with said track, shafts supporting said friction wheels, a lever in which said latter shafts are mounted at one of their ends, a gear wheel mounted on each of the three said shafts in the same plane, a secondary lever pivoted on the carriage and adapted to oscillate the first-mentioned lever so as to bring one or other of the gear wheels on the friction wheel shafts into engagement with the third gear wheel, and means mounted on the track for operating said secondary lever when the carriage reaches the end of its travel.

6. In an irrigating apparatus the combination of a supporting track, a carriage mounted on and adapted to traverse said track, a revoluble sprayer, a shaft journaled in said carriage and secured to said sprayer, a pair of friction wheels each adapted to engage with said track, independent shafts each supporting one of said friction wheels, means for alternatively driving one or other of said latter shafts by the first-mentioned shaft, and means for adjusting the pressure of the said friction wheels against said track.

In witness whereof I have hereunto set my hand in presence of two witnesses.

CARL SIGFRID NYBERG.

Witnesses:
  CARL TH. SUNDHOLM,
  H. D. OHLSSON.

Copies of this patent may be obtained for five cents each, by addressing the "Commissioner of Patents, Washington, D. C."